United States Patent Office 3,330,455
Patented July 11, 1967

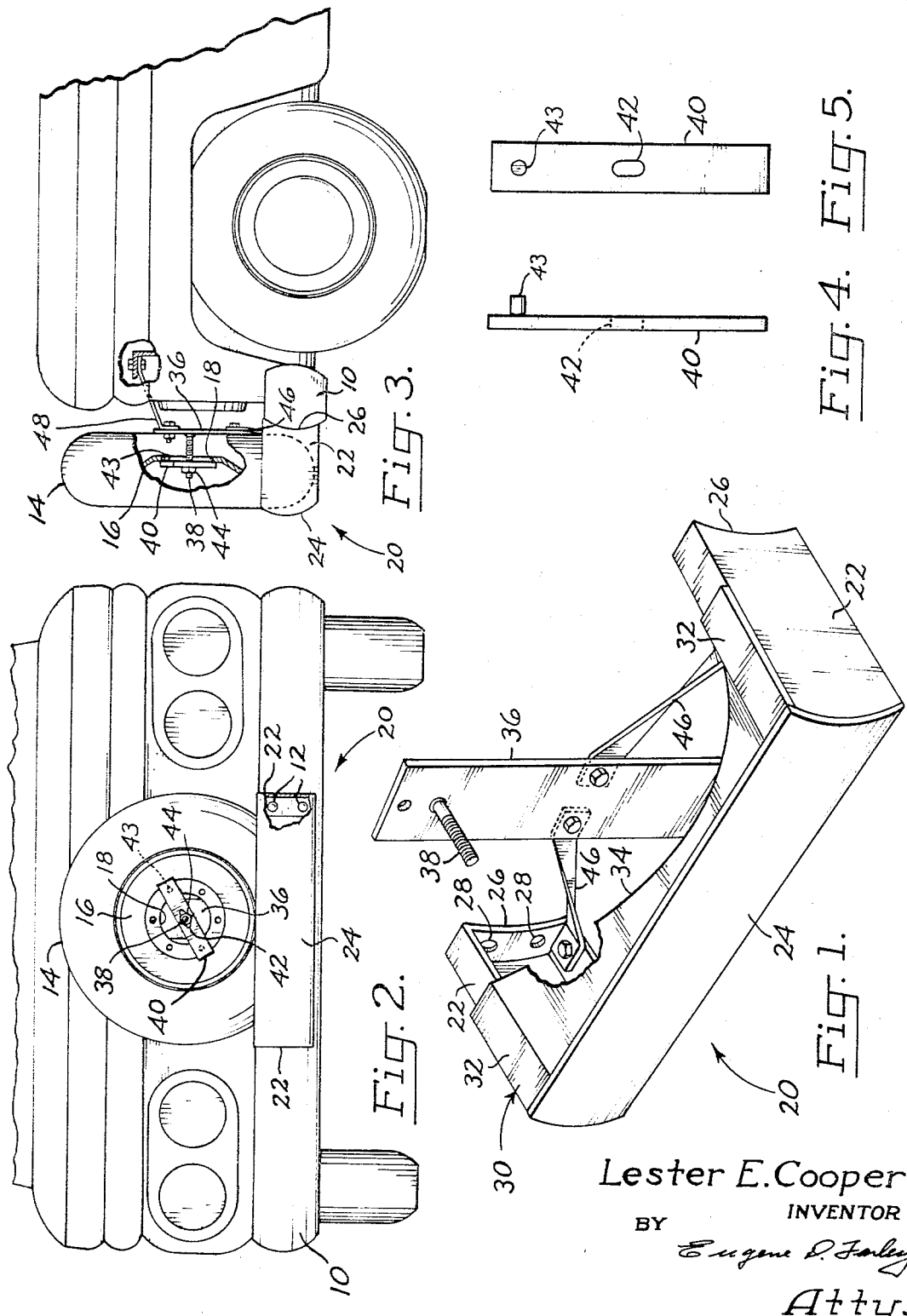

3,330,455
SPARE TIRE MOUNTING RACK
Lester E. Cooper, 4603 Apple Ave.,
Olympia, Wash. 98504
Filed Mar. 21, 1966, Ser. No. 535,809
2 Claims. (Cl. 224—42.06)

This invention relates to a rack for mounting a spare tire assembly on the front of a pickup truck.

As is common knowledge, the spare tire mountings of present day pickup trucks are inaccessible, difficult to operate, and unreliable. This is for the reason that it is general practice to mount the tire horizontally underneath the box at the rear of the truck where it is difficult of access and where it accumulates a large amount of mud and other debris.

It is the general object of this invention to provide a rack for pickup truck spare tire assemblies which enables the assembly to be mounted on the front of the truck where it is accessible, easy to use, safe and reliable.

The manner in which the foregoing and other objects of this invention are accomplished will be apparent from the accompanying specification and claims, considered together with the drawings, wherein:

FIG. 1 is a perspective view of the herein described spare tire mounting rack;

FIG. 2 is a view in front elevation of the rack in position on the front of a pickup truck and partly broken away to reveal the interior construction;

FIG. 3 is a view in side elevation of the spare tire mounting rack of my invention, also partly broken away to make clear the interior construction of the rack; and FIGS. 4 and 5 are views in side and front elevation, respectively, of a retainer used to secure the tire on the rack.

As is apparent in the drawings, the spare tire mounting rack of my invention is adapted for use in mounting a spare tire assembly in the front of a conventional pickup truck including in its frame structure a pair of spaced longitudinal frame members, not illustrated, to which a bumper 10 is secured by means of bolts 12. The tire assembly includes a tire 14 supported in the usual manner on a wheel 16 having therethrough a circular central opening 18 by means of which the tire assembly is mounted on the axle of the truck.

The time assembly is mounted on a rack which includes a substantially U-shaped tire-mounting frame indicated generally at 20. The frame consists in part of a pair of side pieces 22 and a connecting cross piece 24.

The tire-mounting frame is secured suitably to the frame of the truck, as through the agency of a pair of attaching plates 26 welded or otherwise fixed to the ends of side pieces 22 in a plane normal thereto. The securing plates are provided with bolt openings 28 by means of which the tire mounting frame may be bolted to the truck frame, using bumper bolts 12.

A tire support plate 30 spans side pieces 22. The support plate is arranged horizontally and includes a pair of end segments 32 which overlie side pieces 22 of the tire-mounting frame. It also includes an arcuate center segment 34 dimensioned to support the tire assembly in a vertical position.

Bracket means are provided for maintaining the tire assembly in the vertical position on support plate 30.

In the illustrated form of the invention the bracket means comprise an angularly bent bar 36. The lower horizontal segment of the bar is fastened centrally to cross piece 24 of the tire support frame, as by being welded thereto. The upper vertical section of the bar is spaced laterally from the cross piece a sufficient distance to accommodate the width of the tire.

The vertical segment of the bar lies between cross piece 24 and bumper 10. It extends vertically to a height which is somewhat more elevated than the plane of central opening 18 of wheel 16.

Securing means are provided on the upper end of bracket 36 for securing the tire releasably on the rack and for maintaining it in a vertical position.

Although various types of securing means may be employed for this purpose, there may be provided to advantage a stud bolt 38 extending forwardly from the upper end of bracket bar 36 a sufficient distance to penetrate central opening 18 of wheel 12, at substantially its center. A plate 40 having a central longitudinal slot 42 therethrough and a length somewhat greater than the diameter of wheel opening 18 also is provided. A pin 43 on one end of the plate penetrates one of the lug holes of wheel 16 for locating the plate.

Plate 40 overlies the central opening of the wheel, on the side opposite of bracket 36. Stud bolt 38 penetrates slot 42 of the plate. A nut 44 then may be threaded on the outer end of bolt 38, whereupon plate 40 acts as a keeper to secure the wheel releasably in its mounted position.

Padlock means of suitable construction, not illustrated, also may be included in the assembly to lock the mounted tire against theft.

The entire assembly may be stabilized by providing braces 46 tieing the central portion of bracket 36 to side pieces 22, and a link 48 bolted between the top of bracket 36 and a frame member of the vehicle.

It thus will be seen that by the present invention I have provided a spare tire mounting rack which is ideally suitable for use in mounting a spare tire on a pickup truck.

It mounts the tire on the front of a truck where it is out of the way, but readily accessible. In its mounted position the tire is not subject to an accumulation of dirt and debris as it would be if it were mounted on the underside of the truck box, as heretofore. The tire may be mounted on and demounted from the rack with speed and facility. In addition, the tire itself serves to supplement the guarding function of the front bumper in protecting the front of the truck, particularly the radiator, from damage in the event of a collision.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A rack for mounting on the front of a pickup truck provided with a bumper secured to the front of the truck by being bolted thereto, a spare tire assembly including a wheel having a central opening therethrough, the rack comprising (a) a substantially U-shaped tire-mounting frame including a pair of side pieces and a connecting cross piece, (b) attaching means for attaching the tire mounting frame in a horizontal position to the front end of the truck frame, comprising a pair of plates having bolt openings therethrough and secured to the ends of the side pieces of the tire mounting frame, normal thereto, the bolt openings being dimensioned to receive the bumper-securing bolts, (c) a concavely arcuate tire support plate spanning the side pieces of the U-shaped tire mounting frame and supported thereby, (d) the plate being dimensioned to support a tire assembly in a vertical position, (e) bracket means secured centrally to the U-shaped tire mounting frame inside the same and extending vertically therefrom and
(f) securing means on the bracket means for securing the tire assembly thereto.

2. The rack of claim 1 including a centrally perforated plate having a length greater than the diameter of the central opening through the wheel, the plate being adapted for positioning across the opening on the side of the wheel opposite the bracket means, and pin means adjacent one end of the plate for penetrating a lug hole of the wheel for locating the plate, the securing means comprising bolt and nut means dimensioned to penetrate the wheel opening and the perforation through the plate.

References Cited

UNITED STATES PATENTS

| | | | |
|---|---|---|---|
| 1,606,954 | 11/1926 | Moen et al. | 224—42.13 X |
| 2,672,264 | 3/1954 | Steven | 224—42.03 |
| 2,831,622 | 4/1958 | Bacca | 224—42.24 |
| 3,081,924 | 3/1963 | Merbler et al. | 224—42.24 |

FOREIGN PATENTS 158,738  2/1921  Great Britain.

GERALD M. FORLENZA, *Primary Examiner.*

F. WERNER, *Assistant Examiner.*